UNITED STATES PATENT OFFICE.

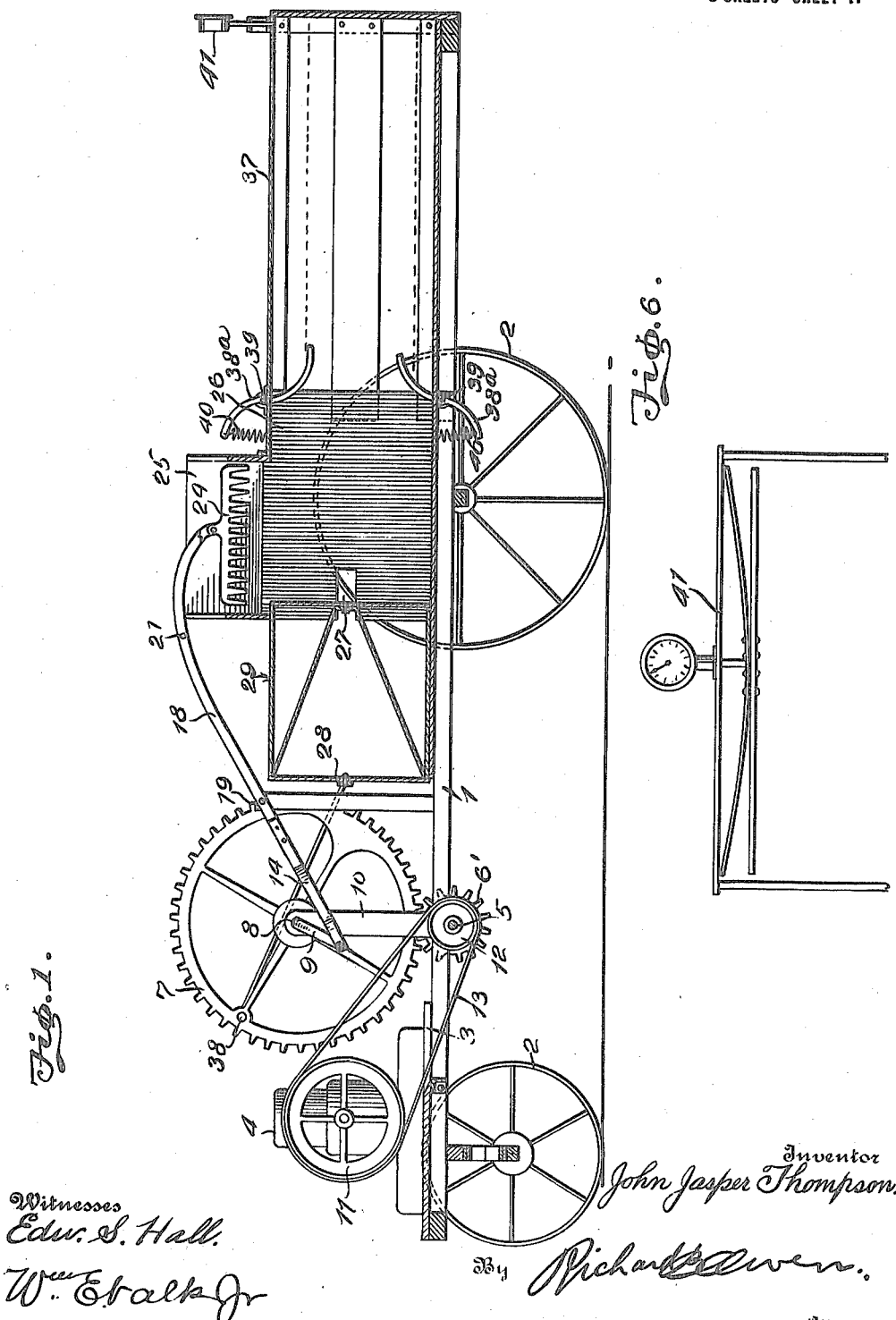

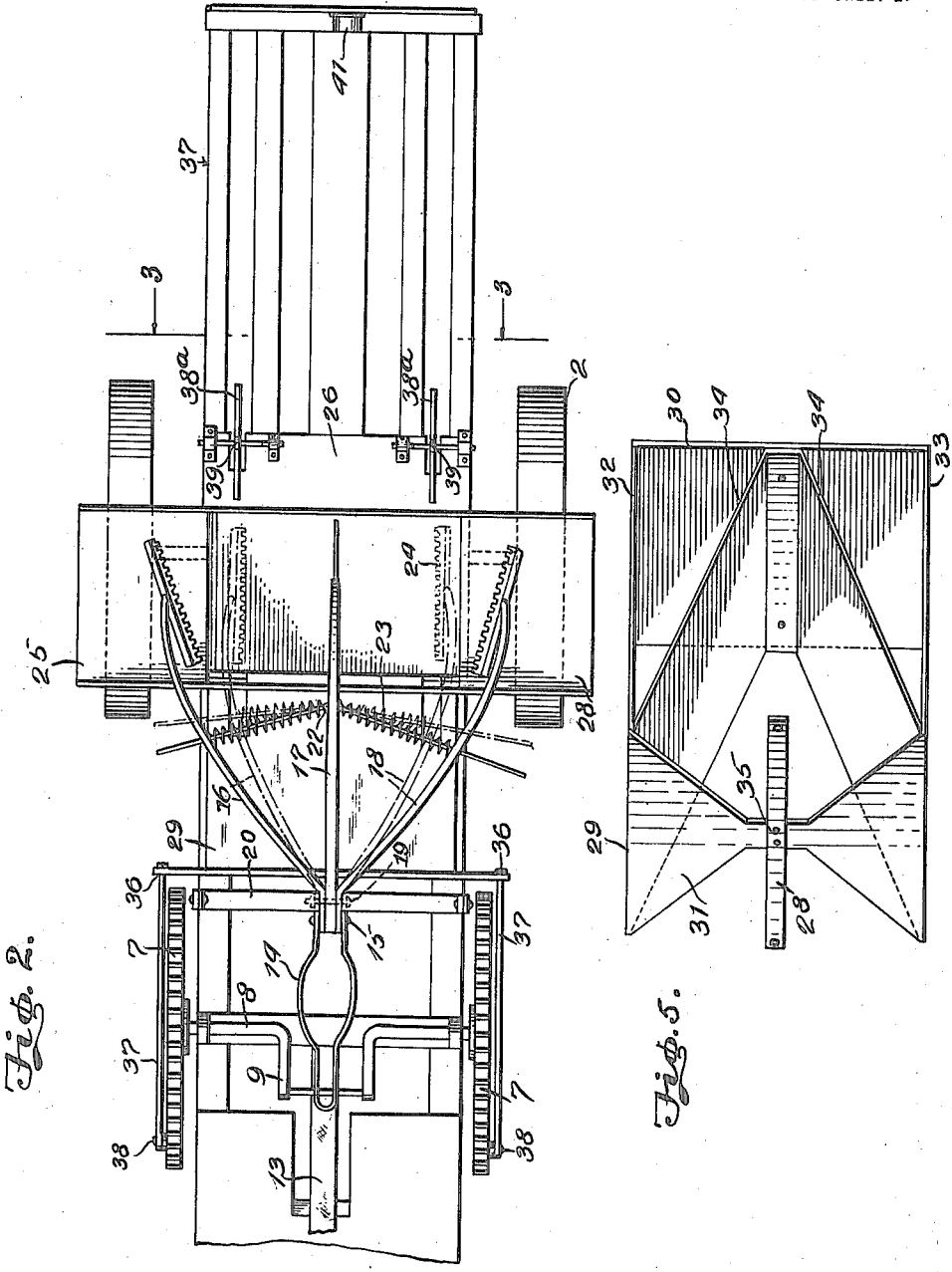

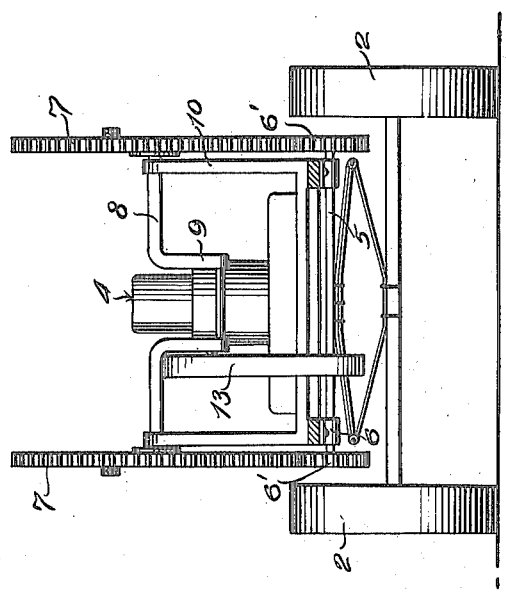
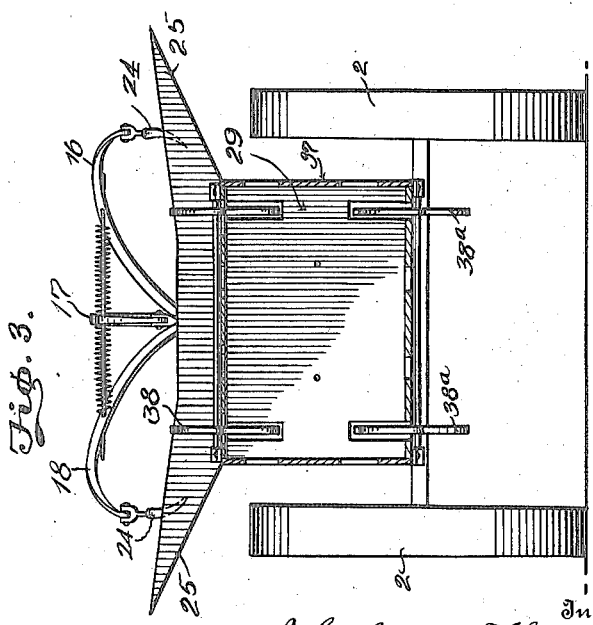

JOHN JASPER THOMPSON, OF ATTICA, ARKANSAS.

HAY-PRESS.

1,248,753. Specification of Letters Patent. Patented Dec. 4, 1917.

Application filed December 9, 1915. Serial No. 65,961.

*To all whom it may concern:*

Be it known that I, JOHN JASPER THOMPSON, a citizen of the United States, residing at Attica, in the county of Randolph and State of Arkansas, have invented certain new and useful Improvements in Hay-Presses, of which the following is a specification.

My invention relates to agricultural machinery and more particularly to an improved power hay press of a construction embodying a feed box; a rake mechanism for forcing the hay at intervals into said feed box; a bale box; a plunger for forcing the hay at intervals from the feed box into the bale box; a common means for operating the plunger and said rake mechanism; and other mechanism to be hereinafter more particularly described.

In describing my invention in detail reference will be had to the accompanying drawings wherein like characters denote like or corresponding parts throughout the several views, and in which:

Figure 1 is a longitudinal sectional view of my improved power hay press;

Fig. 2 is a top plan view;

Fig. 3 is a section on the line 3—3 of Fig. 2;

Fig. 4 is an end elevation;

Fig. 5 is a detail perspective view of the plunger; and

Fig. 6 is a detail elevation of the counter or gage.

Referring now to the drawings by numerals, 1 designates as an entirety the main frame of the press, 2—2 the supporting wheels, 3 a platform mounted upon the frame 1 directly above the front supporting wheels, and 4 the power means (preferably an internal combustion engine) for operating the hay press.

A shaft 5, journaled in bearings 6, is secured to the under side of the frame 1, and mounts a gear 6' for engagement with a comparatively large or operating gear 7, in turn mounted on a shaft 8 having an offset 9 formed therein intermediate its ends, said shaft 8 extending parallel with the shaft 5 in a horizontal plane thereabove. Bearings 10 in the nature of uprights, support the shaft 8 in the manner desired. The power necessary to rotation of the shaft 5 is derived from the engine 4, a pulley 11 being mounted on the engine shaft and a pulley 12 on the shaft 5, the mentioned pulleys having arranged thereover a belt 13 that power may be transmitted from one to the other thereof. While it would appear from the foregoing description that the shaft 5 and the shaft 9 each mount but a single gear, it is to be understood that the mentioned shafts each mount two gears, the arrangement of which is best illustrated in Fig. 4 of the drawings.

The offset 9 in the shaft 8 is connected to a bow-spring 14, the said bow-spring being in turn connected as indicated at 15, to resilient arms 16 and 18 and a rake rod 17. The arms 16 and 18 converge in such a manner as to engage the arms 17 and to lie contiguous throughout a portion of their length to thus permit of a pivotal connection as indicated at 19. An upright frame 20 acts as a support for the several arms. Through operation of the crank shaft in the manner above noted it is evident that an oscillatory movement is imparted to the arms, the bow-spring 14 by reason of its contraction and expansion, permitting of such oscillation without imparting to said arms a longitudinal movement relatively to the frame.

Guide rods 21 are pivoted as at 22 to the central arm 17, the said rods penetrating the arms 16 and 18 to guide the latter in an opening and closing movement hereinafter described. Springs 23 brace the rods and abut respectively the opposite sides of the central arm 17 and the adjacent sides of the outside arms 16 and 18 to normally exert pressure on the said outside arms and thus cause the same to be spread at intervals during operation. Rake heads 24 are mounted, one upon the free end of each of the several arms. Inclined platforms 25 are disposed one at each side of the machine frame, the said platforms discharging into a common feed box 26 mounted upon the main frame preferably directly above the rear supporting wheels 2. The opposite sides of the feed box 26 are cut away as indicated at 27 to afford an operating space for a transverse bar 28 forming a part of the plunger designed as an entirety by the numeral 29. Said plunger in its preferred embodiment comprises an abutment plate 30, an end plate 31, top and bottom plates 32 and 33 and brace plates 34, the latter, the brace plates extending from the abutment plate 30 to the end plate 31. The transverse bar 28 before mentioned is fastened as indicated at 35 to the end plate 31 and as indicated at 36 to rods 37 in turn connected as at 38 to the respective operating gears 10 at points adjacent the periphery thereof. Through such arrangement it is evident that rotation of the shaft 8 will not only cause the rake arms 16, 17 and 18 to be oscillated in the manner described, but will cause plunger 29 to be reciprocated interiorly of the feed box 26, such movement of the plunger forcing the hay delivered to the feed box therefrom. Both ends of the feed box 26 are open.

At the forward end of the feed box 26, and of a size, in cross section, approximately that of the feed box, is a bale box 37, the interior dimension of the mentioned box being substantially that of an ordinary bale of hay. Through reciprocation of the plunger 29, the hay delivered to the feed box 26 is forced therefrom at intervals into the bale box 37 where it is packed and tied in a manner hereinafter described.

Detent devices 38ª, pivoted as at 39 at the forward end of the bale box 37 will preclude a return movement of the hay after it has once been forced from the feed box through movement of the plunger 29. Each of the mentioned devices 38ª is spring pressed as indicated at 40 to yield during movement of the plunger and resist a return movement of the baled or compressed hay.

A counter or gage mechanism, designated as an entirety by the numeral 41, is positioned at one end of the bale box 37 to register the number of bales delivered thereto during operation of the machine.

Operation of the hay press is as follows: Hay is fed to the inclined platform 25 at each side of the machine. During operation of the engine 4, motion is transmitted to the shaft 8 through the intermediaries 11, 12, 13, 6' and 7. Rotation of the shaft 8 will oscillate the arms 16, 17 and 18 about the pivot 19 to thus move the rake heads 24 upward and out of the feed box 26. As rake heads 24 are thus moved out of said feed box, the springs 23 will spread the arms 16 and 18 relatively to the central arm 17 to in such manner position the rake heads carried by said arms 16 and 17 directly over the platforms 25. Movement of the shaft 9 will again bring the rake heads into contact with the inclined platforms, whereupon continued movement of said shaft will cause said arms to be forced downwardly and by reason of their contact with the inclined surfaces, inwardly against tension of the springs 23 to in this manner force the hay delivered to the platform, to the feed box 26. The rake head of the central arm 17 will force the hay directly into the feed box. As the hay is delivered to the feed box 26, the plunger 29 is reciprocated and, during movement toward the bale box 27, all hay delivered to the feed box is forced beyond the ratchet devices 38 into the bale box 37. A number of successive operations of the mechanism in the manner stated will cause the bale box to be filled with hay and through repeated operations of the plunger 29 sufficiently depressed to be subsequently baled or tied. The bale-tie extends around the completed bale after the fashion indicated by the dotted lines in Fig. 1. The counter mechanism 41 will register the number of bales.

From the foregoing, taken in connection with the accompanying drawings, it is evident that a crank shaft is utilized to operate the arms 16, 17 and 18, the bow-spring 14 taking up such movement of the crank shaft as would ordinarily impart to said arms a reciprocatory movement; that a common means is utilized to actuate the plunger and the rake mechanism, said plunger and said rake mechanism being so connected with said operating means as to operate simultaneously and at intervals; and that the detent devices 38 will operate automatically to preclude a return movement of the hay after it has been once forced from the feed box to the bale box of the machine.

Having thus fully described my invention, what I claim as new and desire to secure by Letters Patent, is:—

1. In a hay press, a feed box, inclined feed platforms leading thereto upon opposite sides thereof, relatively movable rake devices operating upon said inclined platforms for directing the hay thereon to said feed box, and a means to operate said rake devices.

2. In a hay press, a feed box, inclined feed platforms leading thereto upon opposite sides thereof, rake devices mounted to engage with the top inclined surfaces of the mentioned platforms, a means to move the rake devices while in engagement with said platforms toward the feed box to direct the hay thereto, and a means operating automatically to position the rake devices for a second raking operation immediately subsequent to movement of the rake devices out of engagement with the respective platform.

3. In a hay pres, a feed box, inclined feed platforms leading thereto upon opposite sides thereof, relatively movable rake devices mounted to engage with the respective platforms, a means to move the said devices toward the feed box while in engagement with the respective platforms to direct the hay thereon to said feed box, a means to return said arms to the position first mentioned when moved out of engagement with the respective platforms to permit of a second raking operation, a bale box, and a means operating at intervals within the feed box to force the hay therein into the bale box, substantially as described.

4. In a hay press, a feed box, inclined feed platforms leading thereto upon opposite sides thereof, a means to rake at intervals the feed deposited on said platforms toward and into said feed box, a bale box open to the feed box, a plunger reciprocable within the feed box to direct the hay therein toward and into the bale box, and a common means to operate said rake and said plunger.

5. In a hay press, a feed box, platforms leading to the feed box at opposite sides thereof, rake devices mounted to engage with the respective platforms to force the feed thereon toward and into the feed box, a bale box open to the feed box, a plunger reciprocable within the feed box to force the hay therein toward and into the bale box, a means operating automatically to preclude a return movement of the feed thus acted on, and a common means to operate the rake devices and the plunger.

6. In a hay press, a feed box, platforms leading thereto upon opposite sides thereof, rake devices mounted for movement into and out of engagement with the respective platforms, a crank shaft for imparting to said rake devices the desired movement, a means to drive the crank shaft, and a spring interposed between the offset in said crank shaft and said rake devices to move said devices in the manner stated without longitudinal movement relatively to the press, substantially as described.

In testimony whereof I affix my signature in presence of two witnesses.

JOHN JASPER THOMPSON.

Witnesses:
I. R. Ross,
J. W. Meeks.